United States Patent [19]

Ikumi

[11] Patent Number: 4,773,033
[45] Date of Patent: Sep. 20, 1988

[54] BINARY DATA IDENTIFICATION CIRCUIT

[75] Inventor: Nobuyuki Ikumi, Tokyo, Japan

[73] Assignee: Kabushiki Kaisha Toshiba, Kawasaki, Japan

[21] Appl. No.: 20,124

[22] Filed: Feb. 27, 1987

[30] Foreign Application Priority Data

Mar. 31, 1986 [JP] Japan .................. 61-71133

[51] Int. Cl.$^4$ ................................ G06F 7/38
[52] U.S. Cl. .................. 364/715.1; 364/748; 364/715.04; 364/715.11
[58] Field of Search ............ 364/715, 736, 748; 377/70

[56] References Cited

U.S. PATENT DOCUMENTS

| 3,908,084 | 9/1975 | Wiley | 375/117 |
| 4,161,784 | 7/1979 | Cushing | 364/748 |
| 4,533,992 | 8/1985 | Magar et al. | 364/715 |
| 4,583,197 | 4/1986 | Chappell et al. | 364/715 |
| 4,665,538 | 5/1987 | Machida | 377/70 |
| 4,713,749 | 12/1987 | Magar et al. | 364/200 |

FOREIGN PATENT DOCUMENTS 0228649  7/1987  European Pat. Off. ............ 364/715

OTHER PUBLICATIONS

"Circuit to Determine Number of Leading Zeros in a Binary String", IBM Technical Disclosure Bulletin, vol. 28, #2, pp. 854–855, Jul. 1985.
Oberman, "Digital Circuits for Binary Arithmetic," Chapter 7, Section 2, pp. 277–281.

Primary Examiner—Gary V. Harkcom
Assistant Examiner—Dale M. Shaw
Attorney, Agent, or Firm—Finnegan, Henderson, Farabow, Garrett & Dunner

[57] ABSTRACT

A binary data identification circuit including first and second potential terminals set to first and second logical potential levels, a series circuit including first to $(n-1)$th transfer gates whose conduction states are controlled responsive to 1st to $(n-1)$th bit signals of an input operand containing first to nth bit signals, one end of the series circuit being connected to the first potential terminal, nth to $(2n-2)$th transfer gates which are controlled, responsive to the first to $(n-1)$th bit signals, so as to have opposite conduction states with respect to those of the first to $(n-1)$th transfer gates, the nth to $(2n-2)$th transfer gates being connected at their source to the second potential terminal and at their drain to the drains of the first to $(n-1)$th transfer gates; and first to nth logic gates whose first input terminals receive the first to nth bit signals and whose second terminals are connected to the first potential terminal and to the drains of the first to $(n-1)$th transfer gates, the first to nth logic gates generating effective bit data when the first logical level signal is applied to the first and second input terminals thereof.

6 Claims, 3 Drawing Sheets

BINARY DATA IDENTIFICATION CIRCUIT

BACKGROUND OF THE INVENTION

This invention relates to a binary data identification circuit which can be used in a circuit for, for example, normalizing a result of the operation of a floating-point processing and which is capable of detecting a digit position of an implied "1" of binary data and identifying a bit pattern of the binary data.

A result of the operation of a floating-point processing is normalized by detecting a digit position of a bit "1" (implied "1") first emerging when viewing an input operand in its MSB (most significant bit)-to-LSB (least significant bit) direction and logically shifting a bit or bits corresponding to a position or positions lower than that implied "1" position towards the MSB, in which case "0" is set to the remaining bit position or positions, including the implied "1" position. Now suppose that, for example, an n-bit mantissa data (binary data) having a bit pattern as shown in FIG. 1 is used as an input operand. In this case, detection is made of the bit position (i−1) corresponding to the bit "1" which first emerges when viewing the input operand in a direction from the MSB corresponding to the (n−1)th digit position to the LSB corresponding to the 0th digit position. Then those bits lower in position than the digit position (i−1), that is, those bits present in the (i-2)th to 0th positions are logically shifted to the MSB position. Then, a $\{(n-1)-(i-1)+1=n-i+1\}$ number of bits lower in position than the (i−1) number of bits so logically shifted are all set to "0". In order to implement such normalization, use is made, in the prior art circuit, of barrel shifter 1 for shifting an input operand and shift control circuit 2 for generating shift control data for designating a logical shift position of barrel shifter 1, as shown in FIG. 2. Shift control circuit 2 includes priority encoder 2A and decoder 2B as shown, for example, in FIG. 2. Priority encoder 2A divides the input operand into, for example, m blocks each including 8 bits, detects the digit position of an implied "1" in each block and generates a binary code of 3×m bits representing the digit position detected. For this reason, the respective block of priority encoder 2A is comprised of eight input NAND gates for receiving eight bit signals, an output NAND gate for receiving the output signals of the input NAND gates and inverted replica of a control signal Ei which is an output signal E0 from the preceding block, three AND gates each having four input terminals selectively connected to the output terminals of the input NAND gates and three NOR gates for receiving the output signals of the AND gates and control signal Ei supplied through a corresponding buffer. In this connection it is to be noted that the MSB or a bit "0" of an input operand is supplied as the control signal Ei of the first stage block. This type of priority encoder is disclosed in detail in "Digital Circuits for Binary Arithmetic" by R. M. M. Oberman, pp 277 to 281. Therefore, any further explanation is omitted. This type of priority encoder is proved effective in detecting the digit position of an implied "1" and outputting binary data representing the digit position detected. To this end, however, a fairly great amount of hardware will be required. Where barrel shifter 1 is so arranged that the input operand is logically shifted by the number of bits corresponding to the shift control signal, it is necessary to decode binary data from priority encoder 2A by means of decoder 2B. In this case, a greater amount of hardware is required in constructing decoder 2B, thus resulting in a significant amount of hardware for shift control circuit 2.

SUMMARY OF THE INVENTION

It is accordingly an object of this invention to provide a binary data identification circuit of simpler construction which implements a binary data pattern identification, such as the detection of an implied "1".

This object can be attained by a binary data identification circuit which comprises first and second potential terminals set to first and second logical potential levels; an (n−1) number of series-connected first transfer gates whose conduction states are controlled responsive to a train of the first to (n−1)th bit signals contained in the first to nth input bit signals, a first terminal of a first stage of the (n−1) number of the first transfer gates being connected to the first potential terminal and the first terminal of the remaining (n−2) number of the first transfer gates being connected to the second terminal of the preceding stage first transfer gate; an (n−1) number of second transfer gates which are controlled responsive to the first to (n−1)th bit signals to be set in opposite conduction states with respect to the first transfer gates, the first terminal of the second transfer gate being connected to the second potential terminal and the second terminal of the second transfer gate being connected to the second terminal of the (n−1) number of the first transfer gates; and first to n-th logic gates whose first input terminals receive the first to n-th input bit signals and whose second terminals are connected to the first potential terminal and to the second terminals of the n number of the first transfer gates, respectively, the 1st to nth logic gates generating an effective output when the first predetermined logical level is applied to these input terminals of each of the 1st to nth logic gates.

In this invention, the respective input bit signals are processed by a circuit section comprised of P- and N-channel MOS transistors and logic gates. By so doing, the respective circuit section is comprised of less component parts and it is eventually possible to form a whole binary data identification circuit as a compact unit.

DETAILED DESCRIPTION OF THE PREFERRED EMBODIMENTS

Figure 4:
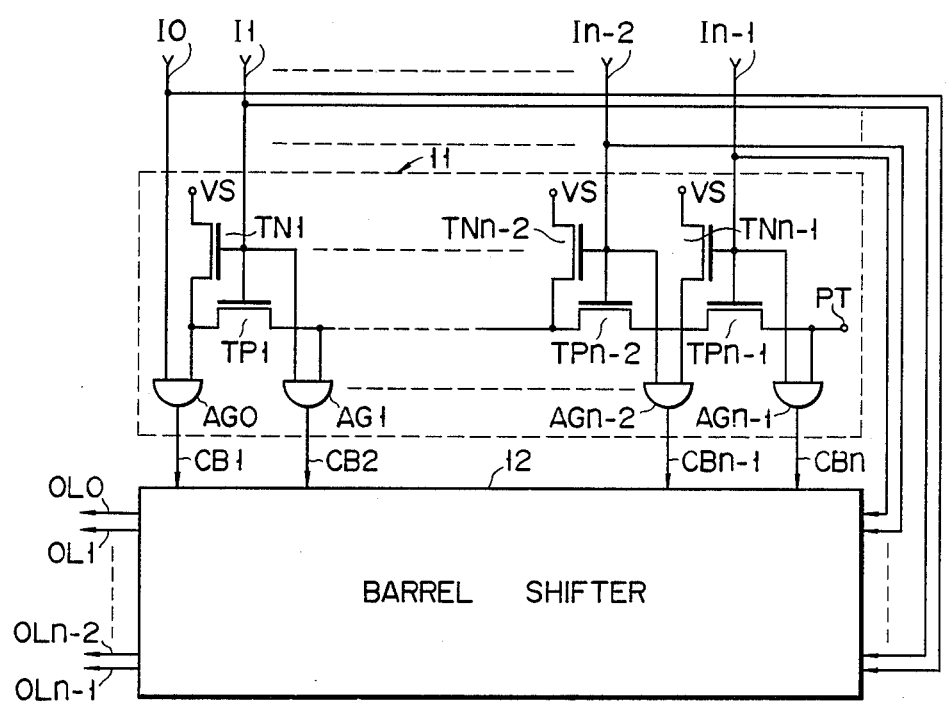
FIG. 4 shows a normalizing circuit which includes a binary data identification circuit according to one embodiment of this invention and for detecting a digit position where "1" first emerges when viewing an input operand in its MSB-to-LSB direction.

FIG. 4 shows a normalizing circuit having binary data identification circuit 11 according to one embodiment of this invention, which normalizes a result of an operation obtained through a floating-point processing. Binary data identification circuit 11, together with n-bit barrel shifter 12, is integrated as shown in FIG. 4. An input operand supplied to binary data identification circuit 11 and barrel shifter 12 is n-bit binary data containing an n number of bit data $In-1$ to $I0$ with bit data $In-1$ and $I0$ represented by an MSB and LSB, respectively. Binary data identification circuit 11 detects a bit position of an implied "1" in the input operand, and shift control signals containing an n number of control bits CB1 to CBn representing amounts of shift corresponding to the shift positions are supplied to barrel shifter 12. Barrel shifter 12 allows the operand to be logically shifted by the number of bits corresponding to the shift control signal from binary data identification circuit 11, and generates output data through output lines OL0 to $OLn-1$.

Identification circuit 11 contains an $(n-1)$ number of transfer gates, for example, a series-circuit of P-channel MOS transistors $TPn-1$ to TP1. Bit data $In-1$ to $I0$ of the input operand except for the LSB are supplied to the gates of P-channel MOS transistors $TPn-1$ to TP1. One end of the series-circuit of MOS transistors $TPn-1$ to TP1, that is, the source of MOS transistor $TPn-1$ whose gate receives the MSB is coupled to first potential terminal PT. In this embodiment, first potential terminal PT is held at a "1" potential level.

An $(n-1)$ number of transfer gates, for example, N-channel MOS transistors $TNn-1$ to TN1, are connected between the drains of P-channel MOS transistors $TPn-1$ to TP1 and a second potential terminal VS. In this embodiment, the second potential terminal VS is held at a "0" potential level. Bit data $In-1$ to $I1$ are supplied to the gates of N-channel MOS transistors $TNn-1$ to TN1.

Furthermore, identification circuit 11 has an n number of AND gates $AGn-1$ to AG0 whose first input terminals receive the n number of bit data $In-1$ to $I0$ in the input operand. The drains of P-channel MOS transistors $TPn-1$ to TP1 are connected to the second terminals of AND gates $AGn-2$ to AG0 and the first gates $AGn-1$ to AG0 are supplied to barrel shifter 12 as the n number of control bits CBn to CB1 of the shift control signal. A circuit section for processing the input bit Ii is comprised of transistors TPi and TNi and AND gate AGi. In this connection, the circuit section for processing the LSB I0 is comprised of AND gate AG0.

The operation of the normalizing circuit shown in FIG. 4 will be explained below.

When bit data $In-2$ is "0", P-channel MOS transistor $TPn-2$ is turned ON and N-channel MOS transistor $TNn-2$ is turned OFF. Thus the source potential of P-channel MOS transistor $TPn-2$ is transferred to the drain thereof. When bit data $In-2$ is "1", P-channel MOS transistor $TPn-2$ is turned OFF and N-channel MOS transistor $TNn-2$ is turned ON. By so doing, the drain of P-channel MOS transistor $TPn-2$ is set to a ground potential level irrespective of its source potential level. That is, as long as the bit "0" continues from the MSB of the input operand downward, P-channel MOS transistors $TPn-1$, $TPn-2$, ... are turned ON and data "1" is transferred through the turned-on P-channel MOS transistor. Now suppose that an input bit Ii of a certain digit position is "1" and that m input bits of higher digit positions than the certain digit position are all "0". In this case, the P-channel MOS transistors receiving the m input bits are all turned ON. As a result, data "1" is transferred through the turned-on P-channel MOS transistor to the source of the P-channel MOS transistor which is supplied with the input bit Ii. Since the AND gates supplied at one input terminal with the m input bits are disabled, output data "0" is generated from these AND gates. Since, however, that AND gate supplied at one input terminal with the input bit Ii of "1" is supplied at the other input terminal with bit data of "1", output data "1" is generated from the aforementioned AND gate. The N-channel MOS transistor supplied with the input bit Ii of "1" is turned ON, causing the drain potential of the P-channel MOS transistor which receives the input bit Ii of "1" to be set to a "0" level. Thus data "0" is generated from the next stage AND gate.

Figure 1:
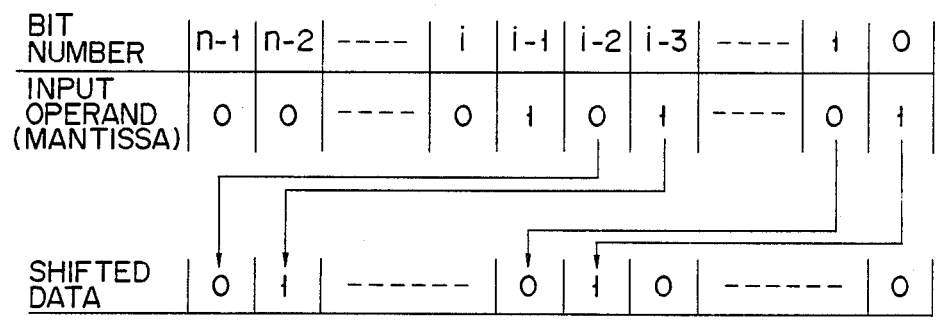
FIG. 1 is a view showing a procedure for normalizing an input operand of an n-bit input signal.
Figure 2:
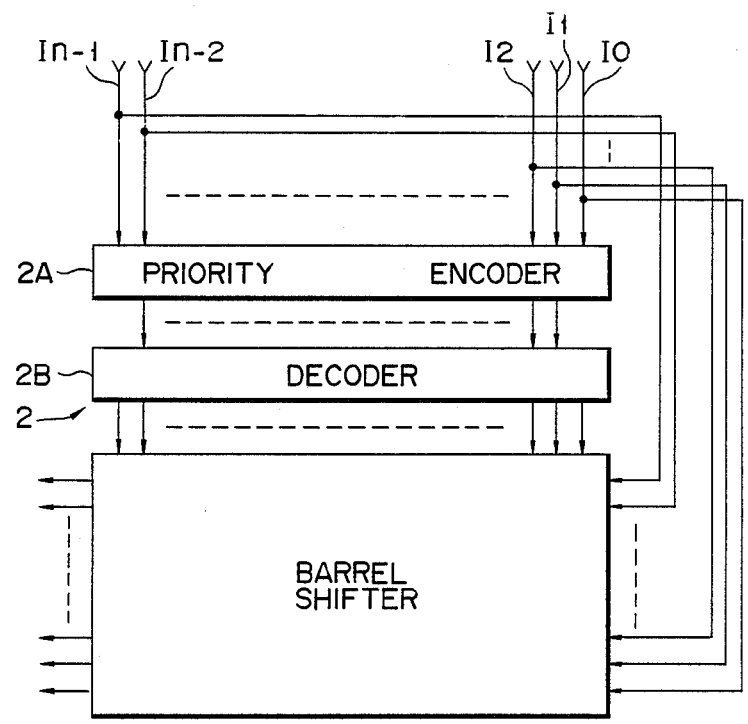
FIG. 2 is a conventional normalizing circuit for normalizing the input operand in the procedure of FIG. 1.

Explanation will be given below about the operation of the circuit of FIG. 4 when an input operand having a bit pattern as shown in FIG. 1 is supplied.

Since the input bits of digit positions $(n-1)$ to i are all "0", P-channel MOS transistors $TPn-1$ to TPi are all turned ON and N-channel MOS transistors $TNn-1$ to TNi are turned OFF. As a result, a source potential of MOS transistor $TPn-1$ which has been set to a "1" level is transferred to the source of MOS transistor $TRi-1$ through MOS transistors $TPn-1$ to TPi.

N-channel MOS transistor $TNi-1$ is turned ON since the input bit of the digit position $(i-1)$ is "1". Thus the source potential of the next stage P-channel MOS transistor $TPi-2$ is set to a "0" level. The source potential of the subsequent stage P-channel MOS transistor $TPi-3$ is set to a "0" level, irrespective of whether the input bit to MOS transistor $TPi-2$ is "1" or "0". For example, if the input bit "1" is supplied to MOS transistor $TPi-2$, N-channel MOS transistor $TNi-2$ is turned ON and thus the source potential of MOS transistor $TPi-3$ is set to a "0" level. If the input bit "0" is supplied to MOS transistor $TRi-2$, this transistor is turned ON and thus the source potential of MOS transistor $TPi-2$ which is set to the "0" level is transferred to the source of MOS transistor $TPi-3$.

In this way, the source potentials of P-channel MOS transistors except for the P-channel MOS transistor receiving the bit "1" of the digit position $(i-1)$ all become "0". As a result, all the AND gates except for AND gate $AGi-1$ are disabled and thus data "0" is generated from the disabled AND gates. Since, however, the source potential of P-channel MOS transistor $TPi-1$ is set to "1" and the input bit Ii of "1" is supplied to the aforementioned MOS transistor, AND gate AGi is enabled to generate data "1". In this way, the n bits are supplied as control bits CBn to CB1 from AND gates $AGn-1$ to AG0, respectively, to barrel shifter 12 in such a format that the bit of the digit position corresponding to an implied "1" is "1" and that the bits corresponding to the other digit positions are all "0".

Barrel shifter 12 is responsive to control bits CBn to CB1 to logically shift the input operand by the number of bits determined by control bits CBn to CB1. Where, as set out above, the implied "1" is located in the digit position $(i-1)$ of the input operand, those bits corresponding to the $(i-2)$th to 0th digit positions of the input operand are logically shifted so that they emerge, as the MSB data, on the $(n-1)$th to $(n-i+1)$th output lines $OLn-1$ to $OLn-i+1$ of barrel shifter 12, in which case bit "0" appears on the $(n-i)$th to 0th output lines $OLn-i$ to OL0 of barrel shifter 12. For example, where the control bit CBn is "1", barrel shifter 12 logically shifts the input operand by one bit in the upper digit direction, while the LSB data is set to "0". Where the control bit CB2 is "1", barrel shifter 12 logically shifts the input operand by the (n−1)th bit in the upper digit direction. The LSB data of the input operand emerges on the (n−1)th output line OLn−1 and the bit "0" appears on the other output lines OLn−2 to OL0 of barrel shifter 12.

Figure 3:
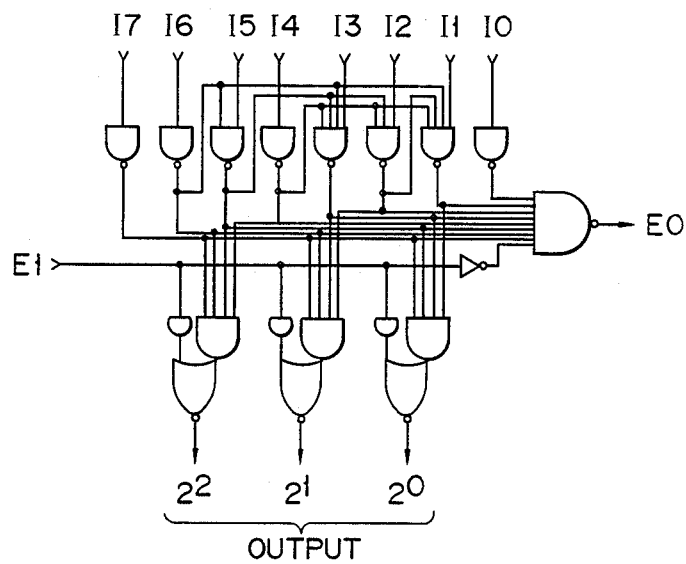
FIG. 3 is a circuit diagram showing a priority encoder for use in the circuit of FIG. 2.

Binary data identification circuit 11 as shown in FIG. 4 may be comprised of 62 MOS transistors if, for example, a block for processing an 8-bit input operand is comprised of a CMOS circuit. That is, in order to perform the processing of each of the upper 7 bits, use is made of 2 transfer gates and 6 MOS transistors of each AND gate. Since no transfer gates are required in the processing of the LSB data, use is made simply of 6 MOS transistors of the AND gates. Priority encoder 2A, as shown in FIG. 3, requires 84 MOS transistors in all, and, in actual practice, decoder 2B is required at a subsequent stage relative to priority encoder 2A, requiring use of even more MOS transistors.

Binary data identification circuit 11, as shown in FIG. 4, has nearly the same arrangement as that of a circuit section for processing each bit, making it easier to obtain an integrated unit with a simplified pattern layout design.

Although this invention has been explained in connection with the aforementioned embodiment, it is not restricted thereto. For example, the binary data identification circuit, as shown in FIG. 4, can be used to perform a control operation other than the logical shift control operation, for example, to perform a priority interruption control operation.

Figure 5:
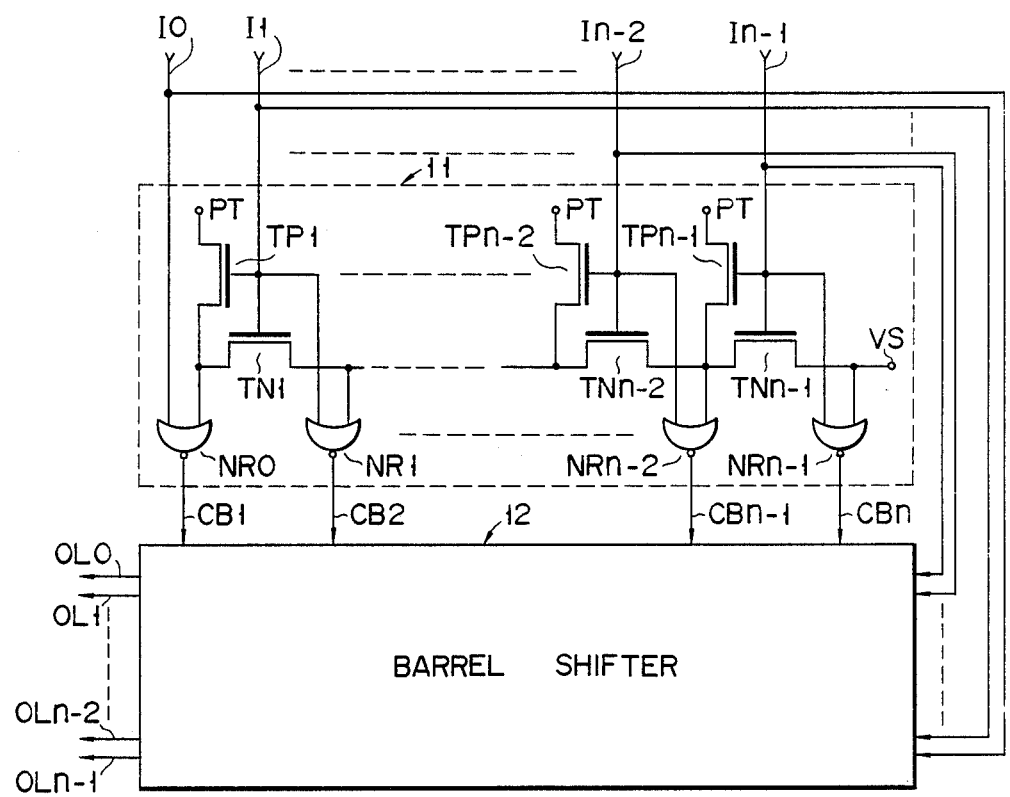
FIG. 5 shows a normalizing circuit which includes a binary data identification circuit according to another embodiment of this invention and for detecting a digit position where "0" first emerges when viewing an input operand in its MSB-to-LSB direction.

The binary data identification circuit can be modified, as shown in FIG. 5, as in the case of detecting that digit position where a bit "0" first appears as viewed in the MSB-to-LSB direction. The binary data identification circuit as shown in FIG. 5 can be provided by replacing MOS transistors TP1 to TPn−1 and AND gates AG0 to AGn−1 in the circuit of FIG. 4 with MOS transistors TN1 to TNn−1 and NOR gates NR0 to NRn−1, respectively, with the terminals PT and VS of the circuit of FIG. 4 replaced with terminals VS and PT, respectively.

The circuit shown in FIG. 5 theoretically operates in the same fashion as shown in FIG. 4 and generates a control signal representing a digit position of the input operand where a bit "0" first appears when viewing the input operand in the MSB-to-LSB direction.

Upon supplying input bits In−1 to I0 in place of the respective input bits I0 to In−1 to the circuit as shown in FIGS. 4 and 5, it is possible to generate a control signal representing the bit position of the bit "1" or "0" which first appears when viewing the input operand in the LSB-to-MSB direction.

In the circuit as shown in FIG. 4 or 5, N-channel MOS transistors can be used in place of MOS transistors TP1 to TPn−1, in which case the inverted replicas of signals of the input bits I1 to In−1 are supplied to the gates of these N-channel MOS transistors, or P-channel MOS transistors can be used in place of MOS transistors TN1 to TNn−1, in which case the inverted replicas of signals of the input bits I1 to In−1 are supplied to the gates of these P-channel transistors.

What is claimed is:

1. A binary data identification circuit, which locates the most significant "1" bit in a digital word, comprising:

n input terminals for receiving first to nth input bit signals;

first and second potential terminals set to first and second predetermined logical potential levels, respectively;

an (n−1) number of series-connected first transfer gates whose conduction states are controlled responsive to first to (n−1)th bit signals of said first to nth input bit signals, a first terminal of a first stage of said (n−1) number of first transfer gates being connected to said first potential terminal and first terminals of the remaining (n−2) number of first transfer gates being connected to the second terminals of the respective preceding-stage first transfer gates;

an (n−1) number of second transfer gates which are controlled responsive to said first to (n−1)th bit signals to have opposite conduction states with respect to those of said first transfer gates, first terminals of second transfer gates being connected to said second potential terminal and second terminals of the second transfer gates being connected to the second terminals of said (n−1) number of first transfer gates; and first to nth logic gates whose first input terminals receive the first to nth input bit signals and whose second terminals are connected to said first potential terminal and to the second terminals of said n number of first transfer gates, each of said first to nth logic gates generating an effective output when receiving input signals at said first predetermined logical level at the first and second input terminals thereof.

2. The binary data identification circuit according to claim 1, wherein said first and second predetermined logical levels are "1" or "0", respectively, said first and second transfer gates are P- and N-channel MOS transistors, respectively, and said logic gates are AND gates.

3. The binary data identification circuit according to claim 1, wherein said first and second predetermined logical levels are "0" and "1", respectively, said first and second transfer gates are N- and P-channel MOS transistors, respectively, and said logic gates are NOR gates.

4. A normalizing circuit comprising:

n input terminals for receiving first to nth input bit signals;

first and second potential terminals set to first and second predetermined logical potential levels;

an (n−1) number of series-connected first transfer gates whose conduction states are controlled responsive to first to (n−1)th input bit signals of said first to nth input bit signals, a first terminal of a first stage of said (n−1) number of first transfer gates being connected to said first potential terminal and the first terminals of the remaining (n−2) number of first transfer gates being connected to the respective second terminals of the preceding stage first transfer gates;

an (n−1) number of second transfer gates which are so controlled responsive to said first to (n−1)th bit signals to have opposite conduction states with respect to those of said first transfer gates, first terminals of said second transfer gates being connected to said second potential terminal and second terminals of said second transfer gates being connected to the second terminal of said (n−1) number of first transfer gates;

first to nth logic gates whose first input terminals are connected to receive said first to nth input bit signals and whose second input terminals are connected to said first potential terminal and to the second terminals of said first to nth first transfer gates, each of said first to nth logic gates generating an effective output when receiving said input signals of said first predetermined logical level at the first and second input terminals thereof; and a barrel shifter responsive to output signals of said first to nth logic gates to allow said first to nth input bit signals to be logically shifted.

5. The normalizing circuit according to claim 4, wherein said first and second predetermined logical levels are "1" and "0", respectively, said first and second transfer gates are P- and N-channel MOS transistors, and said logic gates are AND gates.

6. The normalizing circuit according to claim 4, wherein said first and second predetermined logical levels are "0" and "1", respectively, said first and second transfer gates are N- and P-channel MOS transistors, respectively, and said logic gates are NOR gates.

* * * * *